UNITED STATES PATENT OFFICE.

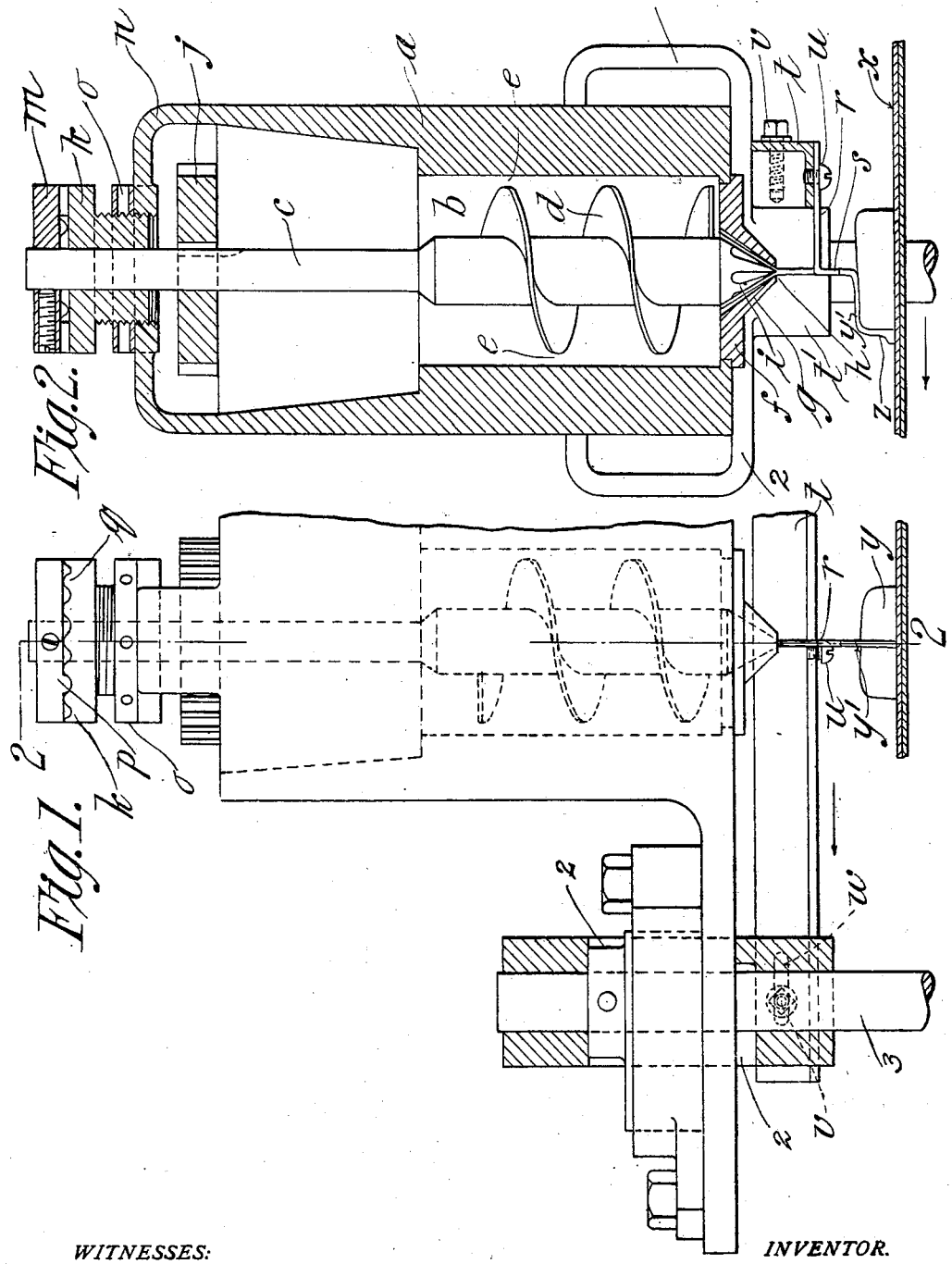
F. H. PAGE.
STRINGING DEVICE FOR MAKING CONFECTIONS.
APPLICATION FILED FEB. 17, 1909.
991,799.
Patented May 9, 1911.

FRANK H. PAGE, OF SPRINGFIELD, MASSACHUSETTS.

STRINGING DEVICE FOR MAKING CONFECTIONS.

991,799.

Specification of Letters Patent.   Patented May 9, 1911.

Application filed February 17, 1909. Serial No. 478,418.

*To all whom it may concern:*

Be it known that I, FRANK H. PAGE, a citizen of the United States of America, residing at Springfield, in the county of Hampden and State of Massachusetts, have invented new and useful Improvements in Stringing Devices for Making Confections, of which the following is a specification.

My present invention relates to improvements in chocolate stringing machines for decorating or ornamenting confections.

The main object of the invention is to provide means for directing the flow of semi-liquid chocolate as it leaves its containing receptacle so that a stream of the same will be properly and evenly directed onto moving confections that are arranged to be passed or moved into a vertical stream of the flowing material.

On account of the viscous nature of the semi-liquid chocolate, it is very desirable in this class of machines to maintain a vertical and uniformly steady flow of the material as it comes into contact with the moving confections, since the viscous nature of the semi-liquid chocolate causes the same to flow in an uneven or irregular manner as it leaves the orifice of the machine, which is somewhat similar to the irregular manner in which molasses or other heavy liquids flow.

Broadly stated, the invention consists in locating below an outlet orifice in which the semi-liquid chocolate is placed, a wire or other element whereby as the stream of flowing chocolate strikes the wire, its path or direction of movement and manner of flow will be controlled, and thereby causing the chocolate to always flow accurately and uniformly onto the moving confection, as will be fully described.

The invention further consists in providing means for adjusting the wire or other element so as to bring the same accurately into the stream of the flowing material, and into the axis of the discharge outlet of the receptacle.

In the drawings forming part of this application,—Figure 1 is a side elevation of my improvement illustrating the same in use, and showing certain operative parts in dotted lines. Fig. 2 is a vertical sectional view on the line 2—2, Fig. 1, clearly showing the location and arrangement of the various parts, and particularly the wire or other element that is located below the outlet orifice for directing the flow of the semi-liquid chocolate as it comes into contact with the confection which is moving past the wire element.

Referring to these drawings in detail, $a$ designates a suitable chamber or receptacle for receiving the semi-liquid or viscous chocolate, the receiving portion of the chamber being designated at $b$. Located within this chamber is a shaft $c$ provided with a feed-screw or helical element $d$ at its lower end.

It will be noticed that the diameter of the feed-screw is less than the diameter of the receiving chamber $b$, as shown at $e$. The lower portion of the receptacle $a$ is provided with a plate $f$ and the center portion of the same is formed with a conical wall $g$ that terminates in the opening or discharge orifice $h$.

Located within the conical wall $g$, and nearly closing the orifice $h$ is the conical portion $i$ of the shaft $c$ which serves to effectively cause the contents of the receptacle to flow through the orifice $h$ without any clogging or stoppage when the shaft $c$ is rotated.

The means for rotating this shaft is shown by the gear $j$, and the means for simultaneously imparting to the shaft a reciprocatory movement is shown at $k$ and $m$,—$k$ designating an element that is screwed into the upper or yoke portion $n$ of the receptacle $a$ and locked therein by means of the nut $o$, and $m$ designating a member that is provided with a projection $p$ which engages the wavy upper surface $q$ of the element $k$. These features for imparting a reciprocating movement to the shaft $c$ form, however, no part of my invention and are merely shown as illustrative means for simultaneously imparting a rotating and reciprocating movement to the shaft $c$, whereby the semi-liquid chocolate is caused to flow constantly from the outlet orifice $h$.

Referring now to the specific means for directing the flow of the semi-liquid chocolate as it leaves the orifice $h$: $r$ designates a wire having a bent portion $s$ which stands in the same axial line as the shaft $c$, and is located immediately below the discharge orifice $h$, as clearly shown in Fig. 2.

$t$ designates a bar for supporting the wire $r$ which is secured thereto by means of a screw or rivet $u$. In order to bring the depending portion $s$ of the wire $r$ accurately below the discharge orifice $h$, it is only necessary to reciprocate the supporting bar $t$ until the desired result is accomplished.

The securing bolt $v$ passes through an elongated slot $w$ in the supporting bar $t$ whereby, when the adjustment of the wire $r$ is made this bolt is tightened, as readily understood.

$t^1$ designates a part of the chamber $a$ to which the bolt $v$ is secured.

$x$ designates a conveyer-belt or apron for receiving the confections $y$, any suitable means being provided for actuating the conveyer-belt so that the confections $y$ are carried in succession beneath the stream of flowing chocolate, as designated at $z$, when a ridge of the material will be formed on each confection, as shown at $y^1$.

When it is not desired to control the flow of chocolate, as it leaves the discharge orifice $h$, the wire $r$ and its depending end portion $s$, may be moved out of the line of flow of the material and permit the semi-liquid chocolate to flow in a zigzag or irregular manner upon the moving confections.

2 designates a bracket element which connects the bearing for the shaft 3 which, however, forms no part of the particular invention in question.

What I claim, is:—

1. In a liquid chocolate stringing machine, the combination with a receptacle for containing the material, the receptacle being provided with a discharge orifice, and stationary means located in the geometric axis of the orifice and spaced from the orifice and onto which the material falls for controlling the direction of flow of the material as it escapes from the receptacle.

2. In a chocolate stringing or decorating machine, a receptacle provided with a discharge orifice, a guide spaced from the orifice and located between the same and the confection to be decorated whereby the normal irregular flow of the material may be varied, as described.

3. In a chocolate stringing machine, the combination with a receptacle and its discharge orifice, a single element having a depending portion and adapted to be placed in the path of the material during the discharge of the material, and means for supporting and adjusting the element into, and out of, the flowing material, whereby the direction of flow may be regulated, as described.

FRANK H. PAGE.

Witnesses:
K. I. CLEMONS,
H. W. BOWEN.

---

Copies of this patent may be obtained for five cents each, by addressing the "Commissioner of Patents, Washington, D. C."